United States Patent
Okamatsu et al.

(10) Patent No.: US 9,694,549 B1
(45) Date of Patent: Jul. 4, 2017

(54) EMULSION COAGULANT AND TIRE PUNCTURE REPAIR KIT

(71) Applicant: THE YOKOHAMA RUBBER CO., LTD., Minato-Ku, Tokyo (JP)

(72) Inventors: Takahiro Okamatsu, Kanagawa (JP); Masahiro Naruse, Kanagawa (JP); Hideyuki Takahara, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 15/116,921

(22) PCT Filed: Feb. 13, 2015

(86) PCT No.: PCT/JP2015/053996
§ 371 (c)(1),
(2) Date: Aug. 5, 2016

(87) PCT Pub. No.: WO2015/122497
PCT Pub. Date: Aug. 20, 2015

(30) Foreign Application Priority Data

Feb. 13, 2014 (JP) .................................. 2014-025350

(51) Int. Cl.
*B29C 73/16* (2006.01)
*C08C 1/15* (2006.01)
*B29K 77/00* (2006.01)
*B29L 30/00* (2006.01)

(52) U.S. Cl.
CPC .............. *B29C 73/163* (2013.01); *C08C 1/15* (2013.01); *B29K 2003/00* (2013.01); *B29K 2077/00* (2013.01); *B29L 2030/00* (2013.01)

(58) Field of Classification Search
CPC .................................. C08L 3/02; B29C 73/16
USPC .............................................. 523/166; 524/52
See application file for complete search history.

(56) References Cited

U.S. PATENT DOCUMENTS

| 2009/0023837 | A1 | 1/2009 | Okamatsu et al. |
| 2013/0072594 | A1 | 3/2013 | Okamatsu et al. |
| 2013/0172465 | A1 | 7/2013 | Okamatsu et al. |
| 2016/0185052 | A1 | 6/2016 | Okamatsu |

FOREIGN PATENT DOCUMENTS

| JP | S53-042188 A | 4/1978 |
| JP | 2007-014947 A | 1/2007 |
| JP | 2009-041006 A | 2/2009 |
| JP | 2011-246610 A | 12/2011 |
| WO | 2011/148854 A1 | 12/2011 |
| WO | 2015/016348 A1 | 2/2015 |

*Primary Examiner* — Edward Cain
(74) *Attorney, Agent, or Firm* — Carrier Blackman & Associates, P.C.; Joseph P. Carrier; William D. Blackman

(57) ABSTRACT

An object of the present invention is to provide an emulsion coagulant having excellent coagulation performance and a tire puncture repair kit that uses the emulsion coagulant. The emulsion coagulant of the present invention is an emulsion coagulant containing an α-starch and an anionic polyacrylamide; a molecular weight of the anionic polyacrylamide being from 500,000 to 2,000,000; and a mass ratio (WA:WB) of a content (WA) of the α-starch to a content (WB) of the anionic polyacrylamide being from 5:95 to 80:20.

9 Claims, 1 Drawing Sheet

EMULSION COAGULANT AND TIRE PUNCTURE REPAIR KIT

TECHNICAL FIELD

The present invention relates to an emulsion coagulant and a tire puncture repair kit.

BACKGROUND ART

Conventionally, a coagulant is used to coagulate an emulsion such as a tire puncture repair liquid (tire puncture sealing material) after repairing a punctured tire.

For example, in Patent Document 1, the inventors of the present invention suggest "an emulsion coagulant for coagulating a tire puncture sealing material containing emulsion particles, in which the emulsion coagulant contains a mineral that induces aggregation of the emulsion particles as a result of weakening a surface charge of the emulsion particles and/or as a result of hydrogen bonding with the emulsion particles, and a gelling agent" (claim 1).

In addition, in Patent Document 2, the present inventors suggests "a liquid coagulant that coagulates an emulsion containing natural rubber latex, in which the liquid coagulant has a pH of 2.0 to 4.0, and contains a urethane resin and/or an acrylic resin having a cationic functional group" (claim 1).

CITATION LIST

Patent Literature

Patent Document 1: Japanese Unexamined Patent Application Publication No. 2009-041006A
Patent Document 2: Japanese Unexamined Patent Application Publication No. 2011-246610A

SUMMARY OF INVENTION

Technical Problem

An object of the present invention is to provide an emulsion coagulant having excellent coagulation performance (ability to rapidly coagulate an emulsion) in the same manner as Patent Documents 1 and 2, and a tire puncture repair kit that uses the emulsion coagulant.

Solution to Problem

As a result of conducting dedicated research on the object described above, the present inventors discovered that using an α-starch and an anionic polyacrylamide with a specific molecular weight in combination at a specific mass ratio yields excellent coagulation performance.

Specifically, the inventors discovered that the object described above can be achieved by the following features.

(1) An emulsion coagulant comprising an α-starch and an anionic polyacrylamide;
a molecular weight of the anionic polyacrylamide being from 500,000 to 2,000,000; and
a mass ratio ($W_A:W_B$) of a content ($W_A$) of the α-starch to a content ($W_B$) of the anionic polyacrylamide being from 5:95 to 80:20.

(2) The emulsion coagulant according to (1) above, wherein an anionic functional group of the anionic polyacrylamide is a carboxylate group; and a ratio of repeating units having the carboxylate group to all repeating units in the anionic polyacrylamide is from 20 to 70 mol %.

(3) The emulsion coagulant according to (1) or (2) above further comprising aluminum sulfate;
wherein the content of aluminum sulfate is not less than 1.0 parts by mass per total of 10 parts by mass of the α-starch and the anionic polyacrylamide.

(4) The emulsion coagulant according to any one of (1) to (3) above, wherein the emulsion coagulant is an emulsion coagulant for coagulating a tire puncture repair liquid containing a natural rubber latex, a synthetic resin emulsion, and an antifreezing agent.

(5) The emulsion coagulant according to (4) above, wherein the antifreezing agent is at least one type of compound selected from the group consisting of ethylene glycol, propylene glycol, and diethylene glycol.

(6) A tire puncture repair kit comprising the emulsion coagulant described in any one of (1) to (5) above and a tire puncture repair liquid.

Advantageous Effects of Invention

As illustrated below, according to the present invention, it is possible to provide an emulsion coagulant having excellent coagulation performance, and a tire puncture repair kit that uses the emulsion coagulant.

DESCRIPTION OF EMBODIMENTS

Figure 1A:
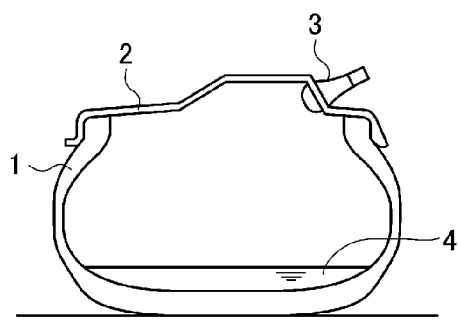
FIG. 1 is a schematic cross-sectional view illustrating an example of a method for recovering a tire puncture repair liquid that uses the emulsion coagulant of the present invention.

The emulsion coagulant and the like of the present invention will be described hereinafter.

In this specification, a numerical range represented using "from . . . to . . . " refers to a range including the numerical values stated before and after the "from . . . to . . . " as an upper limit value and a lower limit value.

Emulsion Coagulant

The emulsion coagulant of the present invention (also called the "coagulant of the present invention" hereafter) contains an α-starch and an anionic polyacrylamide. Here, the molecular weight of the anionic polyacrylamide is from 500,000 to 2,000,000. The mass ratio ($W_A:W_B$) of the content ($W_A$) of the α-starch to the content ($W_B$) of the anionic polyacrylamide is from 5:95 to 80:20.

The coagulant of the present invention is thought to exhibit excellent coagulation performance as a result of employing such a structure.

Although the reason is not clear, it is assumed to be as follows.

As described above, the coagulant of the present invention contains an α-starch and an anionic polyacrylamide. Therefore, when the coagulant of the present invention is compounded into an emulsion, emulsion particles in the emulsion are incorporated into a mesh structure formed by the three-dimensional entanglement of the α-starch and the anionic polyacrylamide, and the emulsion is thus coagulated. Here, since the polyacrylamide contained in the coagulant of the present invention has an anionic functional group, the charge repulsion between emulsion particles is weak due to the interaction with the emulsion particles, which is thought to efficiently promote the coagulation of the emulsion. As illustrated in the working examples and comparative examples described below, this is also predicted from the fact that the coagulation performance is better when an α-starch and an anionic polyacrylamide are used in combination (working examples of this application) than when only an α-starch is used without using an α-starch and an anionic polyacrylamide in combination (Comparative Example 5), when only an anionic polyacrylamide is used (Comparative Example 1), and when an α-starch and a polyacrylamide are used in combination but the polyacrylamide does not have an anionic functional group (Comparative Example 10).

Each component contained in the coagulant of the present invention will be described hereinafter.

α-Starch

The α-starch contained in the coagulant of the present invention is not particularly limited. Here, the term α-starch refers to a starch in a state in which the hydrogen bonds between saccharide chains in the starch have been broken down and the saccharide chains are free, and more specifically, refers to processed starch in which non-gelatinized starch (hereinafter, also referred to as "raw material starch") that has been gelatinized by adding water to, heated, and dried rapidly.

Examples of the above-mentioned raw material starch include non-gelatinized starch separated from potatoes, wheat, rice, corn, sweet potato, cassava, arrowroot, dogtooth violet, broad bean, mung beans, red beans, and the like.

Additionally, the α-starch may be a starch in which processing treatment such as esterification, etherification, or cross-linking have been further carried out on α-starch.

In the coagulant of the present invention, the content of the α-starch is not particularly limited as long as the mass ratio ($W_A$:$W_B$) described below is from 5:95 to 80:20, but the content is preferably from 5 to 80 mass %, more preferably from 10 to 70 mass %, and even more preferably from 10 to 50 mass % with respect to the total amount of the emulsion coagulant.

Anionic Polyacrylamide The anionic polyacrylamide contained in the coagulant of the present invention (also called an "anionic PA" hereinafter) is not particularly limited as long as it is a polyacrylamide having an anionic functional group.

Here, a polyacrylamide refers to a homopolymer of an acrylamide or a copolymer of an acrylamide and another monomer. The other monomer is not particularly limited but is preferably a monomer having a double bond and is more preferably a vinyl monomer (monomer having a vinyl group ($CH_2$=CH—)).

The anionic functional group of the anionic polyacrylamide is not particularly limited, but specific examples include carboxylate groups, sulfonate groups, and phosphonate groups. Here, a carboxylate group refers to a group formed by an ionic bond between —COO$^-$ and a cation (for example, a metal cation; preferably an alkali metal cation). Similarly, a sulfonate group refers to a group formed by an ionic bond between —SO$_3^-$ and a cation (for example, a metal cation; preferably an alkali metal cation). A phosphonate group refers to a group formed by an ionic bond between —PO$_3^{2-}$ or —PO$_3$H$^-$ and a cation (for example, a metal cation; preferably an alkali metal cation). The anionic functional group of the anionic polyacrylamide is preferably a carboxylate group.

Anionic functional groups are ordinarily ionized in an emulsion coagulant and are present as anions (for example, —COO$^-$).

The ratio of repeating units having a carboxylate group to all repeating units in the anionic polyacrylamide (also called the "carboxylic acid unit ratio" hereafter) is not particularly limited but is preferably from 15 to 80 mol %, more preferably from 20 to 70 mol %, and even more preferably from 22 to 50 mol %.

For example, when the anionic polyacrylamide is a compound comprising only 70 repeating units represented by Formula (a1) described below and 30 repeating units represented by Formula (a2) described below (repeating units having a carboxylate group), the carboxylic acid unit ratio is 30 mol % (=30/(70+30)).

An example of a preferred mode of the anionic polyacrylamide is compound A having repeating units represented by Formula (a1) below and repeating units represented by Formula (a2) below. Of these, the substance is preferably a compound comprising only repeating units represented by Formula (a1) below and repeating units represented by Formula (a2) below.

[Chemical Formula 1]

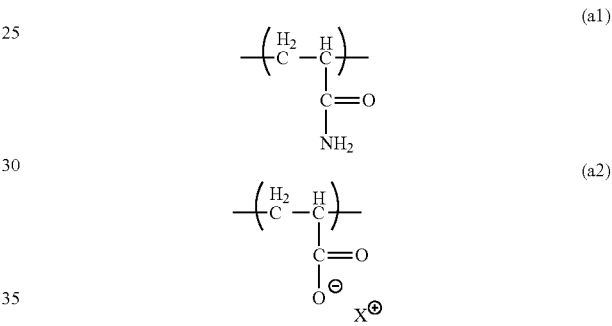

In Formula (a2) above, X represents a monovalent cation. The monovalent cation is not particularly limited but is preferably a monovalent cation of an alkali metal (preferably sodium).

The ratio of repeating units having a carboxylate group to all repeating units in compound A is not particularly limited but is preferably from 15 to 80 mol %, more preferably from 20 to 70 mol %, and even more preferably from 22 to 50 mol %.

The molecular weight of the anionic polyacrylamide is from 500,000 to 2,000,000. Of these, the molecular weight is preferably from 600,000 to 1,800,000 and more preferably from 1,000,000 to 1,500,000. When the molecular weight of the anionic polyacrylamide is outside the range of from 500,000 to 2,000,000, it becomes difficult to incorporate the emulsion particles, and the coagulation performance is diminished. In this specification, the molecular weight refers to the weight average molecular weight (Mw) (expressed in terms of polyethylene glycol) measured using gel permeation chromatography (GPC) under the following conditions.

Solvent: dimethylformamide

Measurement temperature: 40° C.

The method for producing the anionic polyacrylamide is not particularly limited, and a publicly known method may be used. For example, the anionic polyacrylamide may be produced by copolymerizing an acrylamide and an anionic vinyl monomer. Here, an anionic vinyl monomer is a vinyl monomer having an anionic functional group. The definition, specific examples, and preferred aspects of the anionic functional group are as described above.

In the coagulant of the present invention, the content of the anionic polyacrylamide is not particularly limited as long as the mass ratio ($W_A:W_B$) described below is from 5:95 to 80:20, but the content is preferably from 20 to 95 mass %, more preferably from 30 to 90 mass %, and even more preferably from 50 to 90 mass % with respect to the entire amount of the emulsion coagulant.

Mass Ratio ($W_A:W_B$)

The mass ratio ($W_A:W_B$) of the content ($W_A$) of the α-starch to the content ($W_B$) of the anionic polyacrylamide is from 5:95 to 80:20. Of these, the mass ratio is preferably from 10:90 to 70:30 and more preferably from 10:90 to 50:50.

When the mass ratio ($W_A:W_B$) is outside the range of from 5:95 to 80:20, it becomes difficult to incorporate the emulsion particles, and the coagulation performance is diminished.

Optional Components

The coagulant of the present invention may also contain other components (optional components) in addition to the components described above as necessary. Examples of such optional components include fillers, antiaging agents, antioxidants, pigments (dyes), plasticizers, thixotropic agents, UV absorbents, flame retardants, surfactants, dispersants, dewatering agents, and antistatic agents.

Aluminum Sulfate

The coagulant of the present invention preferably further contains aluminum sulfate in that the resulting coagulant exhibits even better coagulation performance. Aluminum sulfate is ordinarily present as a positively charged ion in water, so aluminum sulfate functions as a negatively charged fine particle adsorbent.

The content of the aluminum sulfate is not particularly limited but is preferably not less than 0.1 parts by mass and more preferably not less than 1.0 parts by mass per total of 10 parts by mass of the α-starch and the anionic polyacrylamide. The upper limit is not particularly limited but is preferably not more than 10 parts by mass and more preferably not more than 5 parts by mass per total of 10 parts by mass of the α-starch and the anionic polyacrylamide.

The content of the aluminum sulfate is preferably from 1 to 50 mass % and more preferably from 7 to 30 mass % with respect to the total amount of the emulsion coagulant.

Production Method of the Emulsion Coagulant

The method for producing the coagulant of the present invention is not particularly limited, and an example thereof is a method of mixing each of the components described above using an agitator.

Application

The coagulant of the present invention is particularly useful as an emulsion coagulant for coagulating a tire puncture repair liquid (tire puncture repair liquid after repairing a punctured tire).

Tire Puncture Repair Liquid

A tire puncture repair liquid that is coagulated by the coagulant of the present invention is not particularly limited.

Examples of the tire puncture repair liquid include a repair liquid that contains a natural rubber latex and/or a synthetic resin emulsion, a repair liquid that contains an antifreezing agent in addition to these, or the like. Of these, a repair liquid containing a natural rubber latex, a synthetic resin emulsion, and an antifreezing agent is preferable.

Additionally, in a synthetic resin emulsion, the phase of the synthetic resin, which is a dispersoid, may be a liquid phase or a solid phase.

In general, a system in which a liquid phase dispersoid is dispersed in a liquid phase dispersion medium is called an "emulsion", and a system in which a solid phase dispersoid is dispersed in a liquid phase dispersion medium is called a "suspension"; however, in the present specification, the term "emulsion" includes "suspension".

Natural Rubber Latex

The natural rubber latex described above is not particularly limited, and a conventionally known natural rubber latex can be used.

Specific examples of the natural rubber latex include material sampled from Hevea *brasiliensis* by tapping, and so-called "deproteinized natural rubber latex", which is protein-free natural rubber latex.

Synthetic Resin Emulsion

The synthetic resin emulsion is not particularly limited, and conventionally known synthetic resin emulsions can be used.

More specifically, examples of the synthetic resin emulsion include a urethane emulsion, an acrylic emulsion, a polyolefin emulsion, an ethylene vinyl acetate copolymer emulsion, a polyvinyl acetate emulsion, an ethylene-vinyl acetate-vinyl versatate copolymer emulsion, a polyvinyl chloride emulsion, and the like, and a single type thereof may be used independently, or two or more types may be used in combination.

Antifreezing Agent

The antifreezing agent is not particularly limited, and it is possible to use a conventionally-known antifreezing agent.

More specifically, examples of the antifreezing agent include ethylene glycol, propylene glycol, diethylene glycol, glycerin, methanol, ethanol, isopropyl alcohol and the like, and a single type thereof may be used independently, or two or more types may be used in combination. Of these, the antifreezing agent is preferably at least one type of a compound selected from the group consisting of ethylene glycol, propylene glycol, and diethylene glycol.

Additives

In addition to each of the above-mentioned components, the tire puncture repair liquid that is coagulated by the coagulant of the present invention can include various additives such as a filler, an anti-aging agent, an antioxidant, a pigment (dye), a plasticizer, a thixotropic agent, a UV absorbent, a flame retardant, a surfactant (including a leveling agent), a dispersant, a dehydrating agent, or an antistatic agent as necessary.

When the coagulant of the present invention is used as an emulsion coagulant of a tire puncture repair liquid, the amount of the emulsion coagulant used per 100 parts by mass of the tire puncture repair liquid is not particularly limited but is preferably from 1 to 100 parts by mass, more preferably from 3 to 50 parts by mass, and even more preferably from 5 to 10 parts by mass.

Examples of the form (for example, the usage form or marketing form) of the coagulant of the present invention include individual use of the emulsion coagulant, and a set including the coagulant and a tire puncture repair liquid (a tire puncture repair kit).

Recovery Method

A method for recovering tire puncture repair liquid that uses the coagulant of the present invention (hereinafter, also referred to as a "method of using the coagulant of the present invention") will be described below using FIGS. 1A to 1C. Additionally, the method of using the coagulant of the present invention is not particularly limited to the aspect that is illustrated in FIGS. 1A to 1C.

Figure 1B:
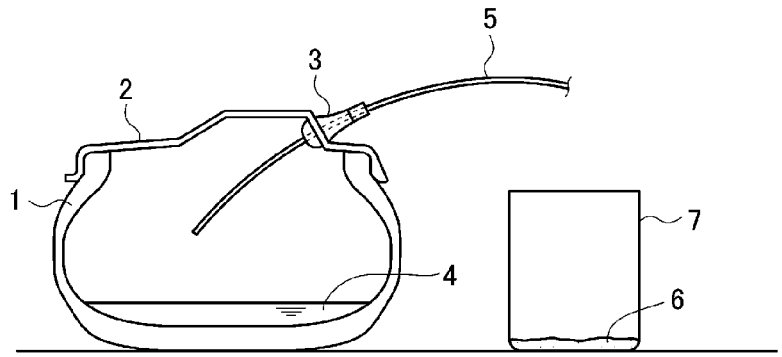
Figure 1C:
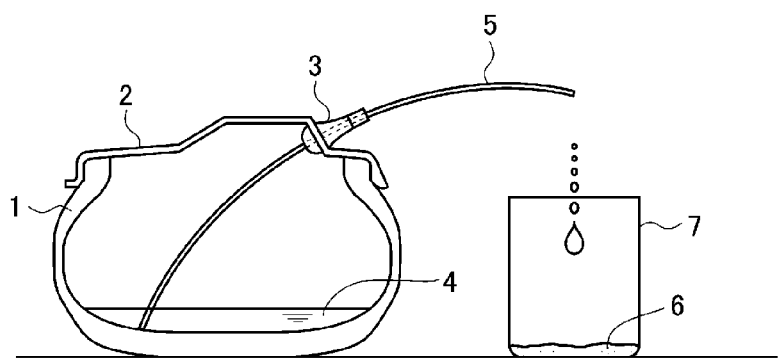

FIGS. 1A to 1C are schematic cross-sectional views illustrating an example of a method for recovering a tire puncture repair liquid that uses the coagulant of the present invention.

Firstly, as illustrated in FIG. 1A, a valve core (not illustrated in the drawing) is detached from a tire valve 3 of a wheel 2 in which a tire puncture repair liquid 4 is injected inside a pneumatic tire 1.

Next, as illustrated in FIG. 1B, a tube 5 is inserted inside the pneumatic tire 1 via the tire valve 3.

Subsequently, as illustrated in FIG. 1C, when the tip end of the tube 5, which is inserted, reaches the liquid surface of the tire puncture repair liquid 4, the tire puncture repair liquid 4 flows backward from inside the pressurized pneumatic tire 1 through the tube 5, and it is possible to recover the tire puncture repair liquid in a recovery pouch 7 into which the emulsion coagulant 6 is inserted in advance.

Tire Puncture Repair Kit

The tire puncture repair kit of the present invention includes the coagulant of the present invention and a tire puncture repair liquid. In this instance, the tire puncture repair liquid in the tire puncture repair kit of the present invention is the same as the above-mentioned tire puncture repair liquid that is described as the target for coagulation by the coagulant of the present invention.

EXAMPLES

Hereinafter, the present invention will be further described in detail using working examples; however, the present invention is not limited thereto.

Preparation of Tire Puncture Repair Liquid

A tire puncture repair liquid was prepared by mixing the components shown in Table 1 below at the ratios (parts by mass) shown in the table using an agitator.

TABLE 1

|  | Tire puncture repair liquid |
| --- | --- |
| Natural rubber latex | 30 |
| Synthetic resin emulsion | 30 |
| Antifreezing agent | 40 |

The details of each component shown in Table 1 are as follows.

Natural rubber latex: natural rubber latex (HA Latex, solid content: 60 mass %, produced by Golden Hope Co., Ltd.)

Synthetic resin emulsion: ethylene-vinyl acetate copolymer emulsion (solid content: 51 mass %, Sumika Flex S-408HQE, produced by Sumika Chemtex Co., Ltd.)

Antifreezing agent: polypropylene glycol (solid content: 100 mass %, produced by Wako Pure Chemical Industries Co., Ltd.)

Production of Emulsion Coagulant

Emulsion coagulants (each emulsion coagulant of the working examples and the comparative examples) were produced by mixing the components shown in Table 2 below at the ratios (parts by mass) shown in the table using an agitator. For example, in Working Example 1, an emulsion coagulant was produced by mixing 0.5 parts by mass of an α-starch (α-tapioca for industrial use) and 9.5 parts by mass of anionic PA1 (acrylamide-sodium acrylate copolymer) using an agitator.

Evaluation: Coagulation Performance

Each of the emulsion coagulants of the working examples and the comparative examples was compounded in 100 parts by mass of the prepared tire puncture repair liquid in the "amount of emulsion coagulant used (parts by mass) per 100 parts by mass of the tire puncture repair liquid" respectively shown in Table 2 and stirred.

After stirring, the mixtures were left to stand at −40° C., and the time (coagulation time) until fluidity is lost without the liquid content oozing out from the mixture of the tire puncture repair liquid and the emulsion coagulant was measured.

The coagulation performance was then evaluated using the following criteria. The results are shown in Table 2. The result is preferably from AA to C, more preferably from AA to B, and even more preferably AA or A.

"AA": coagulation time not more than 5 minutes
"A": coagulation time more than 5 minutes and not more than 15 minutes
"B": coagulation time more than 15 minutes and not more than 30 minutes
"C": coagulation time more than 30 minutes and not more than 1 hour
"D": coagulation time more than 1 hour

TABLE 2

| Table 2-1 | Mw (×10,000) | Carboxylate group unit ratio (mol %) | Comparative Examples 1 | Comparative Examples 2 | Working Examples 1 | Working Examples 2 | Working Examples 3 | Working Examples 4 | Working Examples 5 | Working Examples 6 | Working Examples 7 | Working Examples 8 | Working Examples 9 | Comparative Examples 3 | Comparative Examples 4 | Comparative Examples 5 | Comparative Examples 10 |
| --- | --- | --- | --- | --- | --- | --- | --- | --- | --- | --- | --- | --- | --- | --- | --- | --- | --- |
| α-starch |  |  | 0 | 0.3 | 0.5 | 1 | 2 | 3 | 4 | 5 | 6 | 7 | 8 | 8.5 | 9 | 10 | 3 |
| Anionic PA1 | 140 | 35 | 10 | 9.7 | 9.5 | 9 | 8 | 7 | 6 | 5 | 4 | 3 | 2 | 1.5 | 1 | 0 |  |
| Cationic PA |  |  |  |  |  |  |  |  |  |  |  |  |  |  |  |  | 7 |
| Amount of emulsion coagulant used (parts by mass) per 100 parts by mass of the tire puncture repair liquid |  |  | 10 | 10 | 10 | 10 | 10 | 10 | 10 | 10 | 10 | 10 | 10 | 10 | 10 | 10 | 10 |
| Coagulation performance |  |  | D | D | C | A | A | A | A | A | B | B | C | D | D | D | D |

TABLE 3

| Table 2-2 | Mw (×10,000) | Carboxylate group unit ratio (mol %) | Comparative Examples 6 | Comparative Examples 7 | Comparative Examples 8 | Comparative Examples 9 | Working Examples 10 | Working Examples 11 | Working Examples 12 | Working Examples 13 | Working Examples 14 | Working Examples 15 | Working Examples 16 | Working Examples 32 |
| --- | --- | --- | --- | --- | --- | --- | --- | --- | --- | --- | --- | --- | --- | --- |
| α-starch |  |  | 1 | 5 | 1 | 5 | 3 | 5 | 3 | 5 | 3 | 3 | 1.5 | 7.5 |
| Anionic PA2 | 45 | 35 | 9 | 5 |  |  |  |  |  |  |  |  |  |  |
| Anionic PA3 | 50 | 35 |  |  |  |  |  |  | 7 | 5 |  |  |  |  |

TABLE 3-continued

| | Mw | Carboxylate group unit ratio (mol %) | | | | | | | | | | | | |
|---|---|---|---|---|---|---|---|---|---|---|---|---|---|---|
| Anionic PA4 | 70 | 35 | | | | | | | | | | 7 | | |
| Anionic PA5 | 110 | 35 | | | | | | | | | | | 1.5 | |
| Anionic PA1 | 140 | 35 | | | | | | | | | | | | 7.5 |
| Anionic PA6 | 160 | 35 | | | | | | | | | | 7 | | |
| Anionic PA7 | 190 | 35 | | | | | | | | | 7 | 5 | | |
| Anionic PA8 | 220 | 35 | | | 9 | 5 | | | | | | | | |
| Amount of emulsion coagulant used (parts by mass) per 100 parts by mass of the tire puncture repair liquid | | | 10 | 10 | 10 | 10 | 10 | 10 | 10 | 10 | 10 | 10 | 3 | 15 |
| Coagulation performance | | | D | D | D | D | C | C | C | C | B | B | C | A |

TABLE 4

| Table 2-3 | Mw (×10,000) | Carboxylate group unit ratio (mol %) | Working Examples | | | | | | | |
|---|---|---|---|---|---|---|---|---|---|---|
| | | | 17 | 18 | 19 | 20 | 21 | 22 | 23 | 24 |
| α-starch | | | 5 | 5 | 5 | 5 | 5 | 5 | 7 | 7 |
| Anionic PA9 | 110 | 15 | 5 | | | | | | 3 | |
| Anionic PA10 | 110 | 17.5 | | 5 | | | | | | |
| Anionic PA11 | 110 | 22 | | | 5 | | | | | |
| Anionic PA5 | 110 | 35 | | | | 5 | | | | |
| Anionic PA12 | 110 | 55 | | | | | 5 | | | |
| Anionic PA13 | 110 | 80 | | | | | | 5 | | 3 |
| Amount of emulsion coagulant used (parts by mass) per 100 parts by mass of the tire puncture repair liquid | | | 10 | 10 | 10 | 10 | 10 | 10 | 10 | 10 |
| Coagulation performance | | | C | C | A | A | B | C | C | C |

TABLE 5

| Table 2-4 | Mw (×10,000) | Carboxylate group unit ratio (mol %) | Working Examples | | | | | | |
|---|---|---|---|---|---|---|---|---|---|
| | | | 25 | 26 | 27 | 28 | 29 | 30 | 31 |
| α-starch | | | 3 | 3 | 3 | 3 | 3 | 5 | 5 |
| Anionic PA14 | 190 | 22 | 7 | 7 | 7 | 7 | 7 | | |
| Anionic PA15 | 190 | 80 | | | | | | 5 | 5 |
| Aluminum sulfate | | | | 0.5 | 1 | 2 | 3 | 0.5 | 1 |
| Amount of emulsion coagulant used (parts by mass) per 100 parts by mass of the tire puncture repair liquid | | | 10 | 10.5 | 11 | 12 | 13 | 10.5 | 11 |
| Coagulation performance | | | B | B | AA | AA | AA | B | A |

The details of each component shown in Table 2 above are as follows. The anionic PA1 to PA15 are anionic polyacrylamides having carboxylate groups as anionic functional groups. A cationic PA is a polyacrylamide (cationic polyacrylamide) which does not have an anionic functional group and has a cationic functional group (quaternary ammonium).

α-starch: α-tapioca for industrial use (amylopectin content: 75 mass %, produced by Sanwa Starch Co. Ltd.)

Anionic PA1: acrylamide-sodium acrylate copolymer (reagent, produced by Wako Pure Chemical Industries, Ltd., Mw: 1,400,000, carboxylate unit ratio: 35 mol %)

Anionic PA2: acrylamide-sodium acrylate copolymer (reagent, produced by Wako Pure Chemical Industries, Ltd., Mw: 450,000, carboxylate unit ratio: 35 mol %)

Anionic PA3: acrylamide-sodium acrylate copolymer (reagent, produced by Wako Pure Chemical Industries, Ltd., Mw: 500,000, carboxylate unit ratio: 35 mol %)

Anionic PA4: acrylamide-sodium acrylate copolymer (reagent, produced by Wako Pure Chemical Industries, Ltd., Mw: 700,000, carboxylate unit ratio: 35 mol %)

Anionic PA5: acrylamide-sodium acrylate copolymer (reagent, produced by Wako Pure Chemical Industries, Ltd., Mw: 1,100,000, carboxylate unit ratio: 35 mol %)

Anionic PA6: acrylamide-sodium acrylate copolymer (reagent, produced by Wako Pure Chemical Industries, Ltd., Mw: 1,600,000, carboxylate unit ratio: 35 mol %)

Anionic PA7: acrylamide-sodium acrylate copolymer (reagent, produced by Wako Pure Chemical Industries, Ltd., Mw: 1,900,000, carboxylate unit ratio: 35 mol %)

Anionic PA8: acrylamide-sodium acrylate copolymer (reagent, produced by Wako Pure Chemical Industries, Ltd., Mw: 2,200,000, carboxylate unit ratio: 35 mol %)

Anionic PA9: acrylamide-sodium acrylate copolymer (reagent, produced by Wako Pure Chemical Industries, Ltd., Mw: 1,100,000, carboxylate unit ratio: 15 mol %)

Anionic PA10: acrylamide-sodium acrylate copolymer (reagent, produced by Wako Pure Chemical Industries, Ltd., Mw: 1,100,000, carboxylate unit ratio: 17.5 mol %)

Anionic PA11: acrylamide-sodium acrylate copolymer (reagent, produced by Wako Pure Chemical Industries, Ltd., Mw: 1,100,000, carboxylate unit ratio: 22 mol %)

Anionic PA12: acrylamide-sodium acrylate copolymer (reagent, produced by Wako Pure Chemical Industries, Ltd., Mw: 1,100,000, carboxylate unit ratio: 55 mol %)

Anionic PA13: acrylamide-sodium acrylate copolymer (reagent, produced by Wako Pure Chemical Industries, Ltd., Mw: 1,100,000, carboxylate unit ratio: 80 mol %)

Anionic PA14: acrylamide-sodium acrylate copolymer (reagent, produced by Wako Pure Chemical Industries, Ltd., Mw: 1,900,000, carboxylate unit ratio: 22 mol %)

Anionic PA15: acrylamide-sodium acrylate copolymer (reagent, produced by Wako Pure Chemical Industries, Ltd., Mw: 1,900,000, carboxylate unit ratio: 80 mol %)

Aluminum sulfate: aluminum sulfate (reagent, produced by Wako Pure Chemical Industries, Ltd.)

Cationic PA: acrylamide-quaternary ammonium salt monomer copolymer (reagent, produced by Wako Pure Chemical Industries, Ltd.)

As is clear from Table 2, the working examples of the present application, which have an α-starch and an anionic polyacrylamide and in which the Mw of the anionic polyacrylamide is from 500,000 to 2,000,000 and the mass ratio ($W_A:W_B$) of the content ($W_A$) of the α-starch to the content ($W_B$) of the anionic polyacrylamide is from 5:95 to 80:20, all exhibited excellent coagulation performance in comparison to Comparative Example 1, which does not contain an α-starch, Comparative Example 5, which does not contain an anionic polyacrylamide, Comparative Example 10, which contains a cationic polyacrylamide instead of an anionic polyacrylamide, Comparative Examples 2 to 4 which contain an α-starch and an anionic polyacrylamide but have a mass ratio ($W_A:W_B$) outside the range of from 5:95 to 80:20, and Comparative Examples 6 to 9 which contain an α-starch and an anionic polyacrylamide and have a mass ratio ($W_A:W_B$) of from 5:95 to 80:20 but have an anionic polyacrylamide molecular weight outside the range of from 500,000 to 2,000,000.

In a comparison of Working Examples 1 to 9, Working Examples 2 to 8 having a mass ratio ($W_A:W_B$) of from 10:90 to 70:30 exhibited superior coagulation performance. Of these, Working Examples 2 to 6 having a mass ratio ($W_A:W_B$) of from 10:90 to 50:50 exhibited even better coagulation performance.

In a comparison of Working Examples 4, 6, and 10 to 15, Working Examples 4, 6, 14, and 15, in which the Mw of the anionic polyacrylamide was from 600,000 to 1,800,000, exhibited superior coagulation performance. Of these, Working Examples 4 and 6 having an anionic polyacrylamide Mw of from 1,000,000 to 1,500,000 exhibited even better coagulation performance.

In a comparison of Working Examples 16 and 20, Working Example 20, in which the amount of the emulsion coagulant used per 100 parts by mass of the tire puncture repair liquid was not less than 5 parts by mass, exhibited superior coagulation performance.

In a comparison of Working Examples 17 to 24, Working Examples 19 to 21 having a carboxylate group unit ratio of from 20 to 70 mol % exhibited superior coagulation performance. Of these, Working Example 19 and 20 having a carboxylate group unit ratio of from 22 to 50 mol % exhibited even better coagulation performance.

In a comparison of Working Examples 25 to 31, Working Examples 27 to 29 and 31, which further contained aluminum sulfate and in which the content of the aluminum sulfate was not less than 1.0 parts by mass per total of 10 parts by mass of the α-starch and the anionic polyacrylamide, exhibited superior coagulation performance. In particular, of Working Examples 27 to 29 and 31, Working Examples 27 to 29 having a carboxylate group unit ratio of from 20 to 70 mol % exhibited even better coagulation performance.

REFERENCE SIGNS LIST

1 Pneumatic tire
2 Wheel
3 Tire valve
4 Tire puncture repair liquid
5 Tube
6 Emulsion coagulant
7 Recovery pouch

The invention claimed is:

1. An emulsion coagulant comprising an α-starch and an anionic polyacrylamide;
   a molecular weight of the anionic polyacrylamide being from 500,000 to 2,000,000; and
   a mass ratio ($W_A:W_B$) of a content ($W_A$) of the α-starch to a content ($W_B$) of the anionic polyacrylamide being from 5:95 to 80:20.

2. The emulsion coagulant according to claim 1, wherein an anionic functional group of the anionic polyacrylamide is a carboxylate group; and
   a ratio of repeating units having the carboxylate group to all repeating units in the anionic polyacrylamide is from 20 to 70 mol %.

3. The emulsion coagulant according to claim 1 further comprising aluminum sulfate;
   wherein the content of aluminum sulfate is not less than 1.0 parts by mass per total of 10 parts by mass of the α-starch and the anionic polyacrylamide.

4. The emulsion coagulant according to claim 1, wherein the emulsion coagulant is an emulsion coagulant for coagulating a tire puncture repair liquid containing a natural rubber latex, a synthetic resin emulsion, and an antifreezing agent.

5. The emulsion coagulant according to claim 4, wherein the antifreezing agent is at least one type of compound selected from the group consisting of ethylene glycol, propylene glycol, and diethylene glycol.

6. A tire puncture repair kit comprising the emulsion coagulant described in claim 1 and a tire puncture repair liquid.

7. The emulsion coagulant according to claim 2 further comprising aluminum sulfate;
   wherein the content of aluminum sulfate is not less than 1.0 parts by mass per total of 10 parts by mass of the α-starch and the anionic polyacrylamide.

8. A tire puncture repair kit comprising the emulsion coagulant described in claim 2 and a tire puncture repair liquid.

9. A tire puncture repair kit comprising the emulsion coagulant described in claim 7 and a tire puncture repair liquid.

* * * * *